United States Patent

[11] 3,617,185

[72] Inventor Walter G. Drautz
 Delmar, N.Y.
[21] Appl. No. 753,751
[22] Filed Aug. 19, 1968
[45] Patented Nov. 2, 1971
[73] Assignee GAF Corporation
 New York, N.Y.

[54] STABLE HIGHLY CONCENTRATED SOLUTIONS OF BASIC DYES
 2 Claims, No Drawings
[52] U.S. Cl. ........................................... 8/93,
 8/1 UA, 8/21, 8/62, 8/79, 8/173, 8/7, 8/41, 106/27, 106/189
[51] Int. Cl. ........................................ C09b 67/00
[50] Field of Search ........................................ 8/93, 173, 62, 21, 1.216, 79; 106/27, 189

[56] References Cited
UNITED STATES PATENTS
| | | | |
|---|---|---|---|
| 2,274,751 | 3/1942 | Sowter et al. | 8/173 |
| 1,968,856 | 8/1934 | Rivat | 8/173 |
| 2,118,431 | 5/1938 | Gessler | 8/5 |
| 3,472,605 | 10/1969 | Wicki et al. | 8/93 |
| 3,265,461 | 8/1966 | Luetzel et al. | 8/84 |

OTHER REFERENCES
Ellis, Printing Inks, 1940, p. 353, Diserens, Chem. Tech. of Dye. & Print., 1951, p. 106, AATCC, Tech. Man., 1967 ED., Vol. 43, p. E-146

Primary Examiner—Donald Levy
Assistant Examiner—Patricia C. Ives
Attorneys—Walter C. Kehm and Samson B. Leavitt ABSTRACT: A composition which is employed in the preparation of solutions of basic dyes to maintain their stability during extended periods of storage which comprises in admixture methyl alcohol, 2,2'-thiodiethanol, and a basic dye stock.

STABLE HIGHLY CONCENTRATED SOLUTIONS OF BASIC DYES

The instant invention is directed to the preparation of solutions of basic dyes which are stable during periods of long storage, which solutions comprise in admixture a basic dyestuff, methyl alcohol, and 2,2'-thiodiethanol.

Basic dyes such as those of the diaryl methane and triaryl methane series, basic azo dyes, azo methine dyes, and methine dyes are extensively used in the treatment of paper, textile, and leather goods. In the past, finely ground dyes were used for preparation of the dyeing solution by the dyer rather than the dye manufacturer. The use of finely ground dyes had several disadvantages; for example, finely ground dye powders through unsuitable storage were partly or wholly caked to lumps by the action of moisture or heat, and difficulty resulted in a subsequent attempt to dissolve said dyes. Moreover, several difficulties were experienced in attempts to weigh the finely ground dye power due to the absorption of water by the dye during extended storage periods. Furthermore, difficulties were encountered in transferring or filling the powdered water-soluble intensely colored dyes, as when the powder did not absorb water, these processes were accompanied by unpleasant formation of dust. In addition, during dissolution of the dyes and subsequent stirring thereof, strong frothing often took place which led to the solution's frothing over with resultant contamination and loss.

It has been proposed to add certain substances to avoid the dusting of finely ground dyes and the frothing during preparation of the solutions. Many wetting agents have also been recommended to promote rapid and complete dissolution of dye powders. All these additives merely diminish the said disadvantages without wholly obviating them.

The above disadvantages associated with the use of finely ground basic dyes may be avoided by the use of highly concentrated stock solutions which are supplied directly by the dye manufacturers. The use of dye solutions eliminates the need for the dyer to prepare the dyes themselves, which as noted above may present solubility problems which may also cause the problem of dyestuff particles drifting through the processing apparatus to contaminate other dyes, fabrics, and equipment. Furthermore, the use of concentrated stock solutions insures a more uniform dye bath strength the controls the amount of dyestuff employed. Also the dyestuff in a highly concentrated solution may be run into the dye bath by a simple process such as metering.

In the past, very highly concentrated aqueous solutions have not hitherto been prepared. The salts of basic dyes generally used, in many cases the hydrochlorides will dissolve only in relatively low concentrations in water or other suitable liquids. Therefore, the solutions thus obtained have in the past had no practical importance because of the high proportion of solvent necessary for the basic dye, the high cost of transportation inherent in the use of such a large proportion of solvent, and the complications involved in packaging large quantities of aqueous solutions. Moreover, the use of an aqueous solution created the risks of freezing or evaporation of the solvent prior to its use, especially where the dye solution has to be stored for extended periods of time under adverse conditions such as heat and cold.

In addition to all the above difficulties inherent in the preparation of a concentrated stock solution of a basic dye, other difficulties included the precipitation of the dyestuff from the stock solution which resulted in dye solutions of nonuniform strength and the subsequent specking of the dyed material when a solution of this type was employed in the dyeing process.

Therefore, it is an object of the instant invention to provide stable, concentrated solutions of basic dyes.

Another object of the instant invention is to produce highly concentrated basic dye solutions which will be stable for extended periods of storage even under adverse conditions.

Yet another object of the instant invention is to provide a highly concentrated stable basic dye solution comprising a basic dyestuff, methyl alcohol, and 2,2'-thiodiethanol.

The stable highly concentrated basic dye solution of the instant invention is composed of the basic dyestuff, methanol, and 2,2'-thiodiethanol. The basic dyestuffs which may be employed in connection with the instant invention include basic dyes such as:

| | |
|---|---|
| Chrysoidine Violet | 4,2535 |
| Crystal Violet | 4,2555 |
| Victoria Blue B | 4,4045 |
| Victoria Blue R | 4,4040 |
| Ethyl Violet | 4,2600 |
| Capri Blue G | 5,1000 |
| Cresyl Blue zBS | 5,1010 |
| Fast Grey N | (¹) |
| Fast New Blue 3R | 5,1175 |
| Fast Black | (²) |
| Chrysoidine B | 1,1270 |
| Vesuvin BA | 2,1000 |
| Safranine T | 5,0240 |
| Thioflavine | 4,9005 |
| Rhodamine B | 4,5170 |
| Euchrysin 3R | 4,6005 |
| Induline Scarlet | 5,0080 |
| New Fuchsine | 4,2520 |
| Night Blue | 4,4085 |
| Nile Blue | 5,1180 |
| Nile Blue 2B | 5,1185 |
| Rhoduline Blue 2G | 5,0220 |
| Basic Yellow 11 | 4,8055 |
| Basic Orange 21 | 4,8035 |
| Basic Blue 3 | 5,1005 |
| Basic Blue 1 | 4,2025 |
| Basic Blue 5 | 4,2140 |
| Basic orange 22 | 4,8040 |
| Basic Red 13 | 4,8015 |
| Basic Violet 16 | 4,8013 |
| Basic Violet 7 | 4,8020 |

[1] Obtainable by condensation of p-nitrosodimethylaniline hydrochloride with aniline in the presence of hydrochloric acid.

[2] German Pat. specification No. 40,612, example.

The particular basic dye employed in connection with the instant invention is not critical thereto, and any conventional basic dyestuff may be employed. Therefore, the useful dyestuffs are not limited to those which are specifically set forth herein, but extend to all equivalent basic dyestuffs.

In addition to the basic dyestuff, the highly concentrated solution of the instant invention also comprises methanol. Other solvents were tried in connection with the instant system and were found to be unsuitable therefor, as with the employment of solvents other than methanol, the solution had varying degrees of clarity and precipitation. Furthermore, solutions prepared with solvents other than methyl alcohol did not exhibit the stability which was observed when methyl alcohol was employed in the instant composition. Other solvents which are not suitable for use in the instant invention include ethyl alcohol, isopropyl alcohol, dimethyl formamide, methyl pyrrolidone, butyryl lactone, glycol, and diethylene glycol.

As noted above, we have found a very specific formulation comprising methyl alcohol, 2,2'-thiodiethanol, and a basic dyestuff. When the composition of the instant invention is prepared without the 2,2'-thiodiethanol in combination with methyl alcohol, the resulting solution does not have the stability when high concentrations of dyestuff are employed. In this connection, one may employ from about 5–50 parts methyl alcohol and 5–50 parts 2,2'-thiodiethanol per 100 parts of the total composition. Furthermore, solutions containing from 8–50 parts basic dyestuff may be prepared by use of the instant solvent system.

Other conventional adjuvants may be employed in connection with the novel composition of the instant invention, such adjuvants including, for example, surfactants and water soluble polyethers.

Water-soluble polyethers are the polymerization products of alkylene oxides whose terminal groups can be etherified or esterified such as polyethylene condensation products.

The useful surfactants include, but are not limited to cationic and nonionic surfactants such as polyoxyalkylated alcohols.

As noted above, many attempts have been made in the past to prepare stable highly concentrated solutions of basic dyes because of their inherent usefulness in dyeing processes. These attempts have included the conversion of dyestuffs to water-soluble salts of carboxylic acids, and the subsequent dissolution of the salt in a water-miscible organic solvent, the use of aqueous mediums, the use of a variety of water-soluble solvents and surfactants, and combinations of the above. All of these attempts have the disadvantages previously inherent with concentrated solutions of basic dyes. The instant invention, however, provides a specific formulation which allows the simple preparation of highly concentrated solutions of basic dyes. The formulations are prepared by mixing the dyestuff, methyl alcohol, and 2,2'-thiodiethanol with any other adjuvants which may be desired. All one has to do is mix the ingredients together and package them for shipment without the necessity for use of elaborate and expensive equipment, nor the preparation by chemical reaction of any new materials.

Pure dyes or dyes which have already been shaded may also be used in connection with the preparation of the solutions of the instant invention. Furthermore, the solutions of the dyes may be mixed subsequent to their preparation so as to obtain a desired color. In addition, the dye solutions of the instant invention may be employed in the dyeing of paper, textile fibers, and leather goods. Furthermore, the highly concentrated dye solutions are also suitable for the production of nondrying inks such as those used with self-recording indicating instruments, for the preparation of printing inks for stamp pads, and for typewriter ribbons.

The present invention will now be described by reference to the following specific examples. Such examples are presented for purposes if illustration only, and the present invention is in no way to be deemed as limited thereto.

EXAMPLE 1

The following formulation was prepared:

| | |
|---|---|
| C.I. Basic Yellow 11 (C,I, 48055) | 13.5 parts |
| Methyl alcohol | 43.2 |
| 2,2'Thiodiethanol | 30.3 |
| Polyoxyethylated fatty alcohol | 13.0 |

This formulation resulted in a clear solution and maintained its clarity over a period of 3 months storage.

EXAMPLE 2

The following formulation was prepared:

| | |
|---|---|
| C.I. Basic Orange 21 (C.I. 48035) | 15.0 parts |
| Methyl alcohol | 42.8 |
| 2,2'-Thiodiethanol | 29.8 |
| Polyoxyethylated fatty alcohol | 13.0 |

The above solution was clear and maintained its clarity over a long period of storage.

EXAMPLE 3

The following formulation was prepared:

| | |
|---|---|
| C.I. Basic Green 4 (C.I. 42000) | 50.0 parts |
| Methyl alcohol | 25.0 |
| 2,2'-Thiodiethano | 17.5 |
| Polyoxyethylated fatty alcohol | 7.5 |

The above solution was clear and maintained its clarity over a long period of storage.

EXAMPLE 4

The following formulation was prepared:

| | |
|---|---|
| C.I. Basic Blue 3 (C.I. 51005) | 14.0 parts |
| Methyl alcohol | 50.0 |
| 2,2'-Thiodiethanol | 21.0 |
| Triethanolamine | 30.0 |
| Nonylphenoxypoly ethyleneoxy-ethanol | 10.0 |

This solution was clear and maintained its clarity over a period of 3 months.

EXAMPLE 5

The following formulation was prepared:

| | |
|---|---|
| C.I. Basic Blue 3 (C.I. 51005) | 14.0 parts |
| Ethyl alcohol | 50.0 |
| 2,2'-Thiodiethanol | 21.0 |
| Triethanolamine | 30.0 |
| Nonylphenoxpoly ethyleneoxy-ethanol | 10.0 |

The resulting solution lacked the clarity of those in which methyl alcohol was employed. Furthermore, precipitation was observed on storage over a 3 month period.

EXAMPLE 6

The following formulation was prepared:

| | |
|---|---|
| C.I. Basic Orange 21 (C.I. 48035) | 15.0 parts |
| Dimethyl formamide | 42.8 |
| 2,2'-Thiodiethanol | 29.8 |
| Polyoxyethylated fatty alcohol | 12.7 |

The resulting solution lacked the clarity of those in which methyl alcohol was employed. Furthermore, precipitation was observed on storage over a 3 month period.

EXAMPLE 7

The following formulation was prepared:

| | |
|---|---|
| C.I. Basic Green 4 (C.I. 42000) | 50.0 parts |
| Isopropyl alcohol | 25.0 |
| 2,2'-Thiodiethanol | 17.5 |
| Polyoxyethylated fatty alcohol | 7.5 |

The resulting solution lacked the clarity of those in which methyl alcohol was employed. Furthermore, precipitation was observed on storage over a 3 month period.

EXAMPLE 8

The following formulation was prepared:

| | |
|---|---|
| C.I. Basic Yellow 11 (C.I. 48055 | 13.5 parts |
| Isopropyl alcohol | 43.2 |
| —b 2,2'-Thiodiethanol | 30.3 |
| Polyoxyethylated fatty alcohol | 13.0 |

The resulting solution lacked the clarity of those in which methyl alcohol was employed. Furthermore, precipitation was observed on storage over a 3 month period.

EXAMPLE 9

The following formulation was prepared:

| | |
|---|---|
| C.I. Basic Orange 21 (C.I. 48035) | 15.0 parts |
| Methyl Pyrrolidone | 42.8 |
| 2,2'-Thiodiethanol | 29.8 |
| Polyoxyethylated fatty alcohol | 12.7 |

The resulting solution lacked the clarity of those in which methyl alcohol was employed. Furthermore, precipitation was observed on storage over a 3 month period.

EXAMPLE 10

The following formulation was prepared:

| | |
|---|---|
| C.I. Basic Red 13 (C.I. 48015) | 20.0 parts |
| 2,2'-Thiodiethanol | 50.0 parts |
| Polyoxyethylated fatty alcohol | 15.0 | to which was added 15 parts of butyrolactone to replace the methyl alcohol normally employed in the composition of the instant invention.

The resulting solution lacked the clarity of those in which methyl alcohol was employed. Furthermore, precipitation was observed on storage over a 3 month period.

EXAMPLE 11

The following formulation was prepared:

| | |
|---|---|
| C.I. Basic Red 13 (C.I. 48015) | 20.0 parts |
| 2,2'-Thiodiethanol | 50.0 |
| polyoxyethylated fatty alcohol | 15.0 | to which was added 15 parts of glycol to replace the methyl alcohol normally employed in the composition of the instant invention.

The resulting solution lacked the clarity of those in which methyl alcohol was employed. Furthermore, precipitation was observed on storage over a 3 month period.

EXAMPLE 12

The following formulation was prepared:

| | |
|---|---|
| C.I. Basic Red 13 (C.I. 48015) | 20.0 parts |
| 2,2'-Thiodiethanol | 50.0 |
| Polyoxyethylated fatty alcohol | 15.0 | to which was added 15 parts of diethylene glycol to replace the methyl alcohol normally employed in the composition of the instant invention.

The resulting solution lacked the clarity of those in which methyl alcohol was employed. Furthermore, precipitation was observed on storage over a 3 month period.

EXAMPLE 13

The following formulation was prepared:

| | |
|---|---|
| C.I. Basic Red 14 | 11.0 parts |
| Methyl alcohol | 44.5 |
| 2,2'-Thiodiethanol | 31.2 |
| Polyoxyethylated fatty alcohol | 13.3 |

The above solution was clear and maintained its clarity over a long period of storage.

EXAMPLE 14

The following formulation was prepared:

| | |
|---|---|
| C.I. Basic Yellow 13 | 12.5 parts |
| Methyl alcohol | 43.7 |
| 2,2'-Thiodiethanol | 30.6 |
| Polyoxyethylated fatty alcohol | 13.2 |

The above solution was clear and maintained its clarity over a long period of storage.

EXAMPLE 15

The following formulation was prepared:

| | |
|---|---|
| C.I. Basic Red 15 | 10.0 parts |
| Methyl alcohol | 45.0 |
| 2,2'-Thiodiethanol | 31.5 |
| Polyoxyethylated fatty alcohol | 13.5 |

The above solution was clear and maintained its clarity over a long period of storage.

EXAMPLE 16

The following formulation was prepared:

| | |
|---|---|
| C.I. Basic Green 4 (C.I. 42000) | 50.0 parts |
| Methyl alcohol | 25.0 |
| 2,2'-Thiodiethanol | 17.5 |
| Polyoxyethylated fatty alcohol | 7.5 |

The above solution was clear and maintained its clarity over a long period of storage.

EXAMPLE 17

The following formulation was prepared:

| | |
|---|---|
| C.I. Basic Red 14 | 40.5 |
| C.I. Basic Orange 21 | 62.5 |
| C.I. Basic Green 4 | 11.6 |
| Methyl alcohol | 39.0 |
| 2,2—40-Thiodiethanol | 27.4 |
| Polyoxyethylated fatty alcohol | 11.7 |

The solution was clear and maintained its clarity over a long period of storage.

I claim:

1. A stable, highly concentrated solution of a basic dyestuff consisting essentially of:
   a. 8 to 50 parts of a basic dyestuff;
   b. 5 to 50 parts of methyl alcohol; and
   c. 5 to 50 parts of 2,2'-thiodiethanol, the proportions of the above components totaling substantially 100 parts.
2. The concentrated solution of claim 1 further containing a nonionic surfactant.

* * * * *